United States Patent
Iliadis et al.

(10) Patent No.: US 9,576,224 B2
(45) Date of Patent: Feb. 21, 2017

(54) ROBUST ERROR CORRECTION WITH MULTI-MODEL REPRESENTATION FOR FACE RECOGNITION

(71) Applicant: TCL RESEARCH AMERICA INC., San Jose, CA (US)

(72) Inventors: Michael Iliadis, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 38 days.

(21) Appl. No.: 14/587,562

(22) Filed: Dec. 31, 2014

(65) Prior Publication Data
US 2016/0189006 A1    Jun. 30, 2016

(51) Int. Cl.
*G06K 9/62*  (2006.01)
*G06K 9/52*  (2006.01)
(Continued)

(52) U.S. Cl.
CPC ......... *G06K 9/6256* (2013.01); *G06K 9/00288* (2013.01); *G06K 9/00302* (2013.01); *G06K 9/4661* (2013.01); *G06K 9/52* (2013.01)

(58) Field of Classification Search
CPC ............ G06K 9/00288; G06K 9/00275; G06K 9/6255; G06K 9/6269; G06K 9/66; G06K 9/00281; G06K 9/00295; G06K 9/6227; G06K 9/6249; G06K 9/6256; G06K 9/00248; G06K 9/00308; G06K 9/00228; G06K 9/00221; G06K 9/00302; G06K 9/6257; G06F 17/241; G06T 2207/10016
See application file for complete search history.

(56) References Cited

U.S. PATENT DOCUMENTS

2008/0080743 A1*   4/2008  Schneiderman .. G06F 17/30793
                                                  382/118
2011/0110560 A1*   5/2011  Adhikari ................. G06F 3/017
                                                  382/103
(Continued)

OTHER PUBLICATIONS l2, 1 Regularized correntropy for robust feature selection Ran He; Tieniu Tan; Liang Wang; Wei-Shi Zheng Computer Vision and Pattern Recognition (CVPR), 2012 IEEE Conference on Year: 2012 pp. 2504-2511, DOI: 10.1109/CVPR.2012.6247966.*

*Primary Examiner* — Kim Vu
*Assistant Examiner* — Michael Vanchy, Jr.
(74) *Attorney, Agent, or Firm* — Anova Law Group, PLLC

(57) ABSTRACT

The present invention provides a face recognition method on a computing device, comprising: storing a plurality of training face images, each training face image corresponding to a face class; obtaining one or more face test samples; applying a representation model to represent the face test sample as a combination of the training face images and error terms, wherein a coefficient vector is corresponded to the training face images; estimating the coefficient vector and the error terms by solving a constrained optimization problem; computing a residual error for each face class, the residual error for a face class being an error between the face test sample and the face test sample's representation model represented by the training samples in the face class; classifying the face test sample by selecting the face class that yields the minimal residual error; and presenting the face class of the face test sample.

16 Claims, 6 Drawing Sheets

(51) Int. Cl.
    *G06K 9/46*         (2006.01)
    *G06K 9/00*         (2006.01)

(56) References Cited

U.S. PATENT DOCUMENTS

| | | | |
|---|---|---|---|
| 2012/0131006 A1* | 5/2012 | Siddiqui | G06K 9/624 707/737 |
| 2013/0156300 A1* | 6/2013 | Porikli | G06K 9/6227 382/159 |
| 2014/0344661 A1* | 11/2014 | Sipe | G06F 17/30029 715/230 |

\* cited by examiner

S602

Present a general framework for handling image corruptions by using a multi-model representation of noise terms to formulate an optimization scheme to obtain the coefficient vector $a$ — S702

Choose one or more application specific potential loss functions for characterizing the error terms, and choose a method for regularization — S704

Solve the constrained optimization problem by Alternating Direction Method of Multipliers (ADMM)
- $e$-estimation — S7062
- $z$-estimation — S7064
- $a$-estimation — S7066
- Dual variable updates — S7068

ROBUST ERROR CORRECTION WITH MULTI-MODEL REPRESENTATION FOR FACE RECOGNITION

FIELD OF THE DISCLOSURE

The present disclosure relates to the field of image processing technologies and, more particularly, relates to face recognition techniques.

BACKGROUND

With the development of the computer and image processing technologies, face recognition is more and more used in security systems, interactive video applications, image editing and archiving applications, and computer vision applications, etc. For example, video face recognition has been driven by its huge potential in developing applications in many domains including video surveillance security, augmented reality, automatic video tagging, medical analysis, quality control, and video-lecture assessment. Even though the face recognition is a relatively easy task for human brains, it is challenging for machines due to large variations in appearance of identified objects in terms of orientation, illumination, expression and occlusion.

One challenging problem in face recognition is deducing a subject's identity through a provided image. Research efforts have been made on addressing practical large-scale face recognition systems in uncontrolled environments. Collaborative representation-based classification has been recently thoroughly investigated in recognizing human faces given frontal views with varying expressions and illumination, as well as occlusion and disguise. Previous collaborative representation-based classifiers in Face Recognition (FR) solve a regularized regression model, with the coefficients being either sparse or not sparse, under the assumption that a face can be represented as a linear combination of training faces, as is done in Sparse Representation-Based Classification (SRC).

The main idea of SRC is that a subject's face sample can be represented as a sparse linear combination of available images of the same subject captured under different conditions (e.g., poses, lighting conditions, occlusions etc.). The same principle can also be applied when a face image is represented in a lower dimensional space describing important and easily identifiable features. SRC first codes a testing sample as a sparse linear combination of all the training samples, and then classifies the testing sample by evaluating which class leads to the minimum representation error. The regression model of SRC is formulated with dense noise and an estimated coefficient vector. The coefficient vector is a sparse vector and can be estimated by optimization methods.

Despite the success of sparse representation based classifiers, the necessity of optimization methods for improved FR rates has been criticized. Researchers attribute the enhancement in FR performance to the collaborative representation of one image using multiple similar images, rather than the effect of the optimization method regularized coefficients. Furthermore, regularization of the coefficients can only be successful under certain conditions.

Various existing face recognition schemes have proven robust in modeling the noise characteristics for a range of image corruption types. Error correction methods have been proposed in order to make regression models more robust over outliers (e.g., occlusions). In error correction methods, an auxiliary variable is added to the regression model to characterize the error which is often distributed different from Gaussian. A prior assumption of the distribution of the error is needed in order to estimate it jointly with the representation coefficients. Researchers have investigated the use of the whole structure of the error in order to characterize contiguous occlusions. The error image is assumed to be low-rank and is estimated jointly with the representation coefficients.

Nevertheless, most presented approaches are mainly tested on cases where the noise fits their error model assumptions. For example, researchers consider a low-rank regularizer for the noise term, hence being successful at recognizing faces under block-occlusion. At the same time, other researchers combine low-rankness and sparsity in order to extend their recognition rates in cases such as random pixel corruptions. However, when the percentage of corrupted pixels increases significantly, failing to satisfy the low-rank assumption, recognition rates can reduce dramatically.

Further, in face recognition, complex occlusions and variations and their combinations may occur in both the query images and the training samples. The regularization of the error with one prior distribution might not be sufficient to characterize the error. For example, if the face image has varying facial expressions or lighting variations, then low-rankness alone may not adequately describe the error, rather the error can more fittingly be described as low-rank and sparse.

The disclosed method and system are directed to solve one or more problems set forth above and other problems.

BRIEF SUMMARY OF THE DISCLOSURE

One aspect of the present disclosure provides a face recognition method on a computing device, comprising: storing a plurality of training face images, each training face image corresponding to a face class; obtaining one or more face test samples; applying a representation model to represent the face test sample as a combination of the training face images and error terms, wherein a coefficient vector is corresponded to the training face images; estimating the coefficient vector and the error terms by solving a constrained optimization problem; computing a residual error for each face class, the residual error for a face class being an error between the face test sample and the face test sample's representation model represented by the training samples in the face class; classifying the face test sample by selecting the face class that yields the minimal residual error; and presenting the face class of the face test sample.

Another aspect of the present disclosure provides a face recognition system based on a computing device, comprising: a storage module, an acquisition module, an algorithm module and a presentation module. The storage module is configured to store a plurality of training face images, each training face image corresponding to a face class, each face class including one or more training face images. The acquisition module is configured to obtain one or more face test samples. Further, the algorithm module configured to apply a representation model to represent the face test sample as a combination of the training face images and error terms, wherein a coefficient vector is corresponded to the training face images; to estimate the coefficient vector and the error terms by solving a constrained optimization problem; to compute a residual error for each face class, the residual error for a face class being an error between the face test sample and the face test sample's representation model represented by the training samples in the face class; and to classify the face test sample by selecting the face class that yields the minimal residual error. Moreover, the presentation module is configured to present the face class of the face test sample.

BRIEF DESCRIPTION OF THE DRAWINGS

The following drawings are merely examples for illustrative purposes according to various disclosed embodiments and are not intended to limit the scope of the present disclosure.

FIG. 7 illustrates an exemplary process to estimate a coefficient vector and error terms in the robust error correction multi-model representation model consistent with the disclosed embodiments;

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Figure 1:
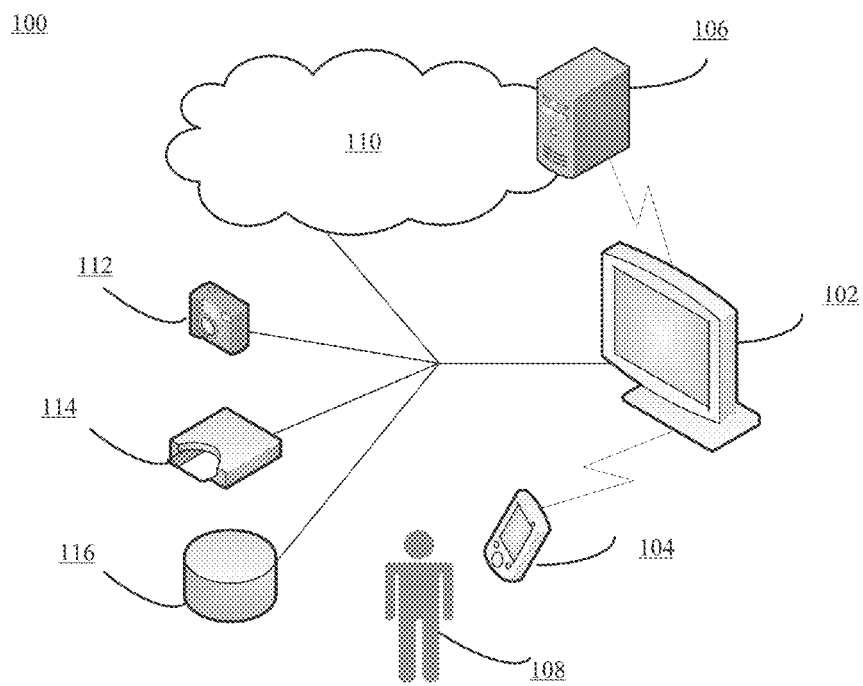
FIG. 1 illustrates an exemplary environment incorporating certain embodiments of the present invention.

FIG. 1 illustrates an exemplary environment 100 incorporating certain embodiments of the present invention. As shown in FIG. 1, environment 100 may include a television set (TV) 102, a remote control 104, a server 106, a user 108, and a network 110, a camera 112, a portable storage 114, and a data storage 116. Certain devices may be omitted and other devices may be included.

TV 102 may include any appropriate type of TV, such as plasma TV, liquid crystal display (LCD) TV, projection TV, non-smart TV, or smart TV. TV 102 may also include other computing systems, such as a personal computer (PC), a tablet or mobile computer, or a smart phone, etc. Further, TV 102 may be any appropriate content-presentation device capable of presenting multiple programs in one or more channels, which may be controlled through the remote control 104.

The remote control 104 may include any appropriate type of remote control that communicates with and controls the TV 102, such as a customized TV remote control, a universal remote control, a tablet computer, a smart phone, or any other computing device capable of performing remote control functions. The remote control 104 may also include other types of devices, such as a motion-sensor based remote control, or a depth-camera enhanced remote control, as well as simple input/output devices such as a keyboard, a mouse, and a voice-activated input device, etc.

The user 108 may interact with TV 102 using remote control 104 to watch various programs and perform other activities of interest, or the user may simply use hand or body gestures to control TV 102 if motion sensor or depth-camera is used by TV 102. The user 108 may be a single user or a plurality of users, such as family members watching TV programs together.

Further, the server 106 may include any appropriate type of server computer or a plurality of server computers for providing video contents to the user 108. The server 106 may also facilitate communication, data storage, and data processing between the remote control 104 and TV 102. TV 102, remote control 104, and server 106 may communicate with each other through one or more communication networks 110, such as a cable network, a phone network, and/or a satellite network, etc.

The network 110 may include any number of communication networks and servers for providing various media for the server 106, such as streaming video, and photos and images, etc.

Camera 112 may be an internal camera in the TV 102, or the server 106 or may be an external camera connected to the TV 102 over a network or a cable. Camera 112 may provide images and videos to the TV 102.

Portable storage 114 may include any appropriate portable storage device for storing images or videos for TV 102, such as memory card, flash disk, and other type of removable storage media. Further, the data storage 116 may be an internal or external data storage device, such as a disk or a database for storing images or videos for TV 102.

Figure 2:
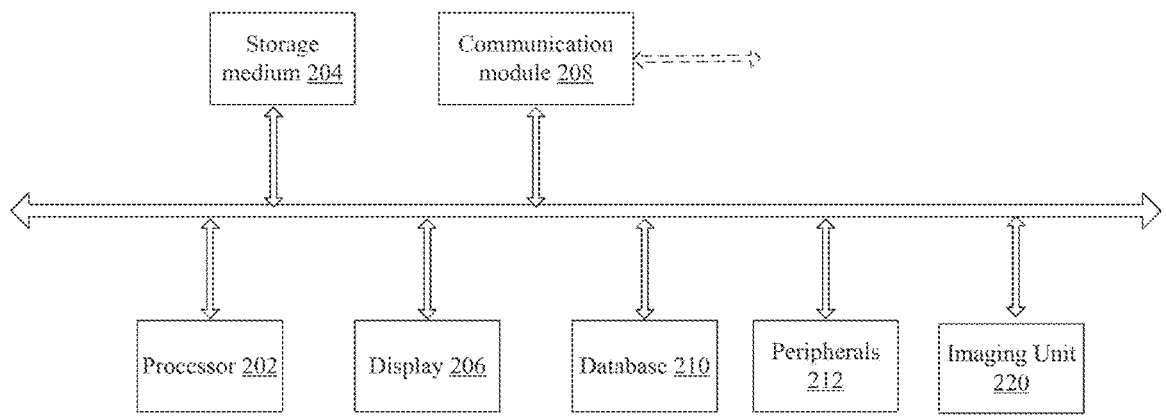
FIG. 2 illustrates an exemplary computing system consistent with the disclosed embodiments.

TV 102, remote control 104, and/or server 106 may be implemented on any appropriate computing circuitry platform. In operation, the computing circuitry platform may obtain images and/or videos from the camera 112, the portable storage 114, the data storage 116, and/or the network 110, and may perform certain image processing, such as face recognition, on the images and/or videos. FIG. 2 shows a block diagram of an exemplary computing system 200 capable of implementing TV 102, remote control 104, and/or server 106.

As shown in FIG. 2, computing system 200 may include a processor 202, a storage medium 204, a display 206, a communication module 208, a database 210, peripherals 212 and an imaging unit 220. Certain devices may be omitted and other devices may be included.

Processor 202 may include any appropriate processor or processors. Further, processor 202 can include multiple cores for multi-thread or parallel processing. Processor 202 may execute sequences of computer program instructions to perform various processes. Storage medium 204 may include memory modules, such as ROM, RAM, flash memory modules, and mass storages, such as CD-ROM and hard disk, etc. Storage medium 204 may store computer programs for implementing various processes when the computer programs are executed by processor 202.

Further, communication module 208 may include certain network interface devices for establishing connections through communication networks. Database 210 may include one or more databases for storing certain data and for performing certain operations on the stored data, such as database searching.

Display 206 may provide information to a user or users of TV 102. Display 206 may include any appropriate type of computer display device or electronic device display (e.g., CRT or LCD based devices). Peripherals 212 may include various sensors and other I/O devices, such as keyboard and mouse. Further, peripherals 212 may receive and/or send data from and/or to imaging unit 220. The imaging unit 220 may include any appropriate image capturing, storage, and/or processing components, which is couple to or coincide with the processor 202.

In operation, the computing system 200, more particularly, processor 202 and/or the imaging unit 220 may perform certain processes to process images from various sources to identify the subject of interest and to provide further processing and applications. For example, the computing system 200 may play back a video and perform face recognition on the images in the video stream.

That is, in operation, TV 102 (or server 106, remote control 104, etc.) may receive a video stream for play back and/or other video/image processing. The video stream may be from locally stored video data, video data received from other sources over the network 110, or video data inputted from camera 112 or other peripherals 212, etc.

Figure 3:
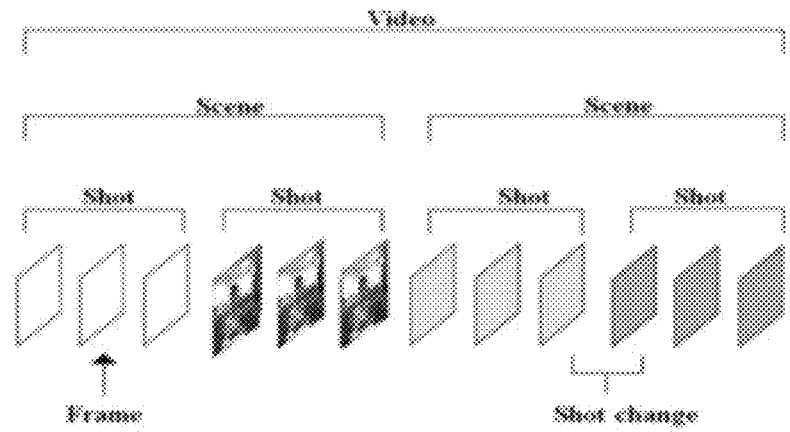
FIG. 3 illustrates a video stream being divided into different video components consistent with the disclosed embodiments.

A video stream may be divided into different video components. As shown in FIG. 3, a video stream may be divided into scenes, a scene may be divided into shots, and a shot may be divided into frames. The frame can be further divided into objects and features of the video frame may be extracted for further processing. The face recognition may be performed on the objects to identify one or more pre-configured subject, i.e., person.

Figure 4:
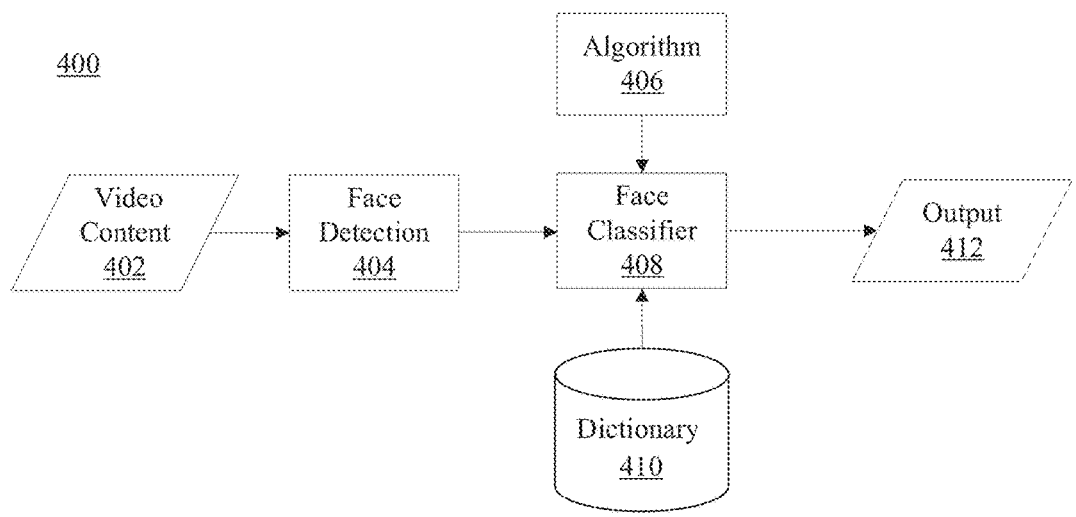
FIG. 4 illustrates a structure schematic diagram of an exemplary face recognition system consistent with the disclosed embodiments.

FIG. 4 illustrates a structure schematic diagram of an exemplary face recognition system 400 consistent with the disclosed embodiments. As shown in FIG. 4, the face recognition system 400 includes video content 402, a face detection module 404, an algorithm module 406, a face classifier 408, a dictionary 410, and an output module 412. Certain components may be omitted and other components may be added. The system 400 (e.g., the various components) may be implemented in hardware, software, or a combination of hardware and software.

The input video or video content 402 may include any appropriate type of source for video contents and may contain various video sources. The contents from the input video 402 may include both video data and metadata. Plurality of frames may be associated with the video contents and may be provided to other modules for processing. A single picture may also be included. The input video is divided into different sets of frames.

The face detection module 404 may be configured to find automatically the location of the faces in a sequence of video frames. The face detection module 404 may reside within TV 102 or outside the TV 102 depending on particular applications.

The algorithm module 406 may be configured to employ an error correction multi-model representation algorithm to process the detected face samples. The face classifier 408 may be configured to perform classification through a robust error correction multi-model representation algorithm and give a final decision of the class identity.

Further, the dictionary 410 may include any appropriate database to store face images, etc. For example, the dictionary 410 may include an in-house or online database that has a collection of face-relevant photos.

The dictionary 410 may be queried to retrieve certain images. For example, for face recognition in a given movie and a set of actors, each actor's (i.e., targeting actor) name and movie's name are used as key words for querying in the dictionary to retrieve a set of images. This image set may contain mostly the targeting actor's images and a few other actors' images, with each image containing one or more actor's faces.

The output module 412 may be configured to output identified faces. The output module 412 may output the identified faces for display to the user 108 or for other application programs for further processing. Certain modules may be merged or omitted and other modules may be included.

Figure 5:
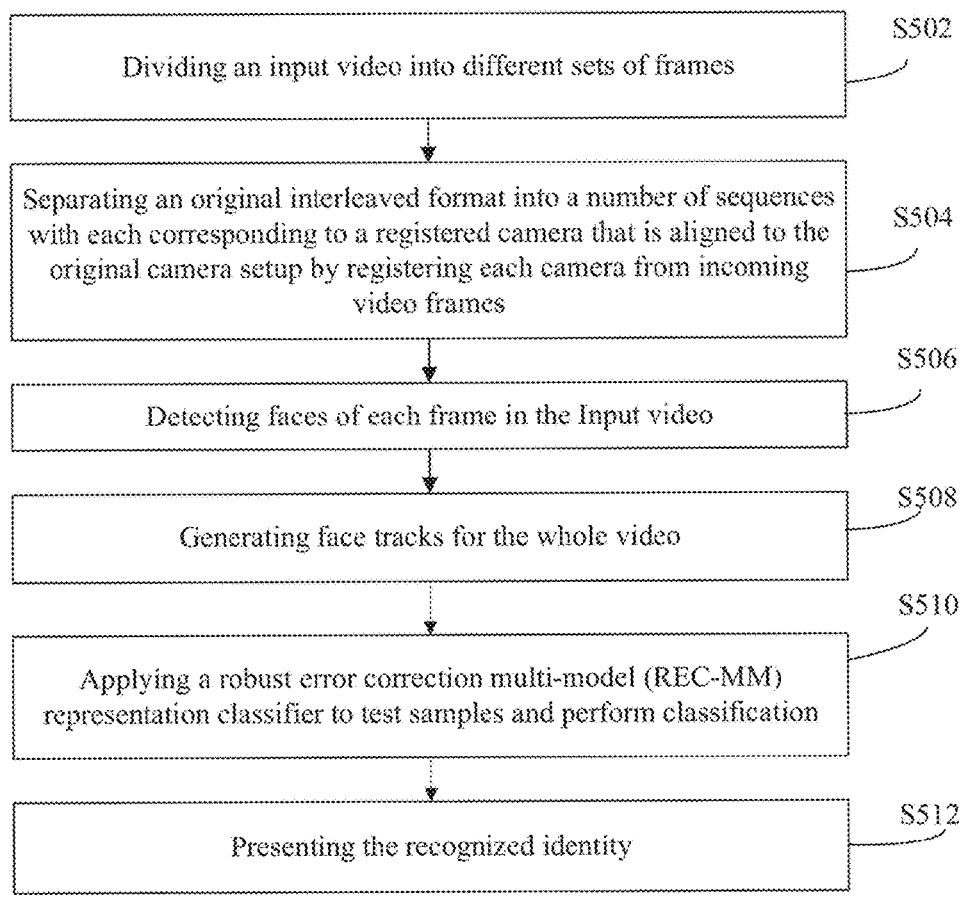
FIG. 5 illustrates a flow chart of an exemplary face recognition process consistent with the disclosed embodiments.

FIG. 5 illustrates a flow chart of an exemplary face recognition process 500 performed by the various modules in the face recognition system consistent with the disclosed embodiments.

As shown in FIG. 5, at the beginning, an input video is divided into different sets of frames (S502). Because a video is a sequence of frames and the changes between consecutive frames are relatively small due to typical frame rate for a video (e.g. 25 frames/second), instead of dealing with each frame individually, some grouping or clustering techniques may be applied to separate the whole video into different sets of frames with each set has similar frames for further processing.

After obtaining the input video sequences, the video sequence is simplified into a frame sequence corresponding to registered camera that is aligned to the original camera setup by registering each camera from incoming video frames (S504).

A typical movie sequence is an interleaved format of a number of camera shots, and a camera take is a continuous recorded performance with a given camera setup. Camera registration, as used herein, may refer to registration of different cameras capturing video frames in a video sequence/stream. The concept of camera registration is based on the camera takes in reconstruction of video edits. A typical video sequence is an interleaved format of a number of camera shots, and a camera take is a continuous recorded performance with a given camera setup. By registering each camera from the incoming video frames, the original interleaved format can be separated into a number of sequences with each corresponding to a registered camera that is aligned to the original camera setup.

After the camera take is identified, faces of each frame in the video are detected (S506). Detecting the faces of each frame in the video can facilitate to produce face tracks before applying face recognition. That is, the face detection can be applied for each frame within each camera take. The face detection may find automatically the location of the faces in a sequence of frames.

The group of detected faces within a same camera take may be used as a face track. In this way, face tracks are generated for the whole video (S508). Specifically, a new face track is initialized by the first detected face for each camera take. For the rest frames of each camera take, if the distance between two detected faces from consecutive frames passes a pre-defined threshold, a new face track is initialized; otherwise this face is added to the current face track. The face images from each face track may be pre-processed for later classification. The pre-processing methods may include averaging the faces in one face track, performing registration to align same faces in one face track, etc.

Further, a robust error correction multi-model representation-based classifier is applied to test face samples and perform classification (S510).

The face recognition may be performed using a representation-based classifier algorithm integrated with error detection or error correction methods. Several notations and calculations are used in face recognition algorithms based on sparse representation, error correction and error detection methods.

Let, each face image be of size j×k=d and y∈$\mathbb{R}^d$ denote the face test sample. Let T=[$T_1, \ldots, T_i, \ldots, T_c$]∈$\mathbb{R}^{d \times n}$ denote the matrix (dictionary) with the set of samples of c subjects stacked in columns. $T_i \in \mathbb{R}^{d \times n_i}$ denotes the $n_i$ set of samples of the $i^{th}$ subject, such that, $\Sigma_i \, n_i$=n.

In Sparse Representation-Based Classification (SRC), the regression model is formulated as:

$$y=Ta+\text{noise} \quad (1)$$

where noise∈$\mathbb{R}^d$ is dense noise and a∈$\mathbb{R}^n$ is the estimated coefficient vector. In the SRC formulation of model (1), a is a sparse vector with nonzero elements corresponding to a few samples in T. Thus, the test sample can be represented as a sparse linear combination of the samples in T. The coefficients of a can be estimated by solving the optimization problem, $$a=\text{argmin}_a \|y-Ta\|_2^2+\lambda\|a\|_1 \quad (2)$$

where λ>0. In order to enforce sparsity, $l_1$ optimization algorithms can be employed. The final step of the SRC method is to identify the subject by selecting the face class that yields the minimum reconstruction error.

Error correction methods can be employed with the SRC model in order to make regression models more robust over outliers (e.g., occlusions). In error correction methods, an auxiliary variable is added to the regression model to characterize the error which is often distributed different from Gaussian. A prior assumption of the distribution of the error is needed in order to estimate it jointly with the representation coefficients. With the assumption that the error term follows a distribution, such as a Laplace distribution, the following model can be employed:

$$y=Ta+e+\text{noise} \quad (3)$$

where e∈$\mathbb{R}^d$ the auxiliary error variable which is sparsely regularized. The coefficients of a and e can be estimated solving the alternating optimization problem, $$a,e=\text{argmin}_{a,e}\|y-Ta-e\|_2^2+\lambda\|e\|_1+\lambda\|a\|_1. \quad (4)$$

In order to characterize contiguous occlusions, the whole structure of the error may be used. The error image is assumed to be low-rank and is estimated jointly with the representation coefficients. The optimization problem under the assumption that the error is low-rank is formulated as, $$\underset{a,e}{\text{minimize}} \quad \lambda\|E\|_*+\lambda_1\|a\|_2^2 \quad (5)$$
$$\text{subject to} \quad y-Ta=e$$

where E∈$\mathbb{R}^{j \times k}$, e=vec(E), where vec(•) denotes the column-vectorized version of a matrix and $\lambda_1$>0 (λ>0). The recovery of low-rank matrices can be used to remove outliers.

In order to jointly handle the pixel-level sparse noise and image-level structural noise, a two norm regression model may be employed to characterize the error. The two norms may be the nuclear norm and the $l_1$-norm, and the model is $$\underset{a,e}{\text{minimize}} \quad \lambda_3\|E\|_*+\lambda_2\|e\|_1+\lambda_1\|a\|_2^2 \quad (6)$$
$$\text{subject to} \quad y-Ta=e$$

where $\lambda_1, \lambda_2, \lambda_3$>0.

Error detection methods may employ statistical methods combined with sparsity to get a robust result in complex occlusions and corruption in images. In error detection methods, a penalty function is introduced to the optimization problem (2) so as to detect and remove outlier pixels. The optimization problem is thus formulated as $$a=\text{argmin}_a\|Q(y-Ta)\|_2^2+\lambda Q(a), \quad (7)$$

where W∈$\mathbb{R}^{d \times d}$ is a diagonal weight matrix whose elements are defined as $W_{i,i}=w_i$, where $w_i\in[0,1]$ is the weight assigned to pixel i according to a specified weight function. Solving problem (7) consists of two steps: the estimation of the weights given the error $\|y-Ta\|_2$ and the estimation of a given the weights W. Different functions Q (a) may be chosen to regularize the coefficients a, such as using $Q(a)=\|a\|_1$ combined with different weight functions, employing $Q(a)=\|a\|_2^2$, or enforcing a nonnegative a≥0 regularization term.

The error distribution is estimated iteratively using the iterative reweighted least squares (IRLS) method. Large weights are given to pixels in the residual image with small errors in the previous reconstructed iteration, while small weights are given to pixels in the residual image with large errors. Thus, outlier pixels do not contribute much to the reconstruction at the next iteration, and at convergence, the estimated error will mainly consist of those outliers, as desired. After the final iteration is complete, the face identity is chosen based on the minimum class residual provided by the updated coefficients.

Figure 6:
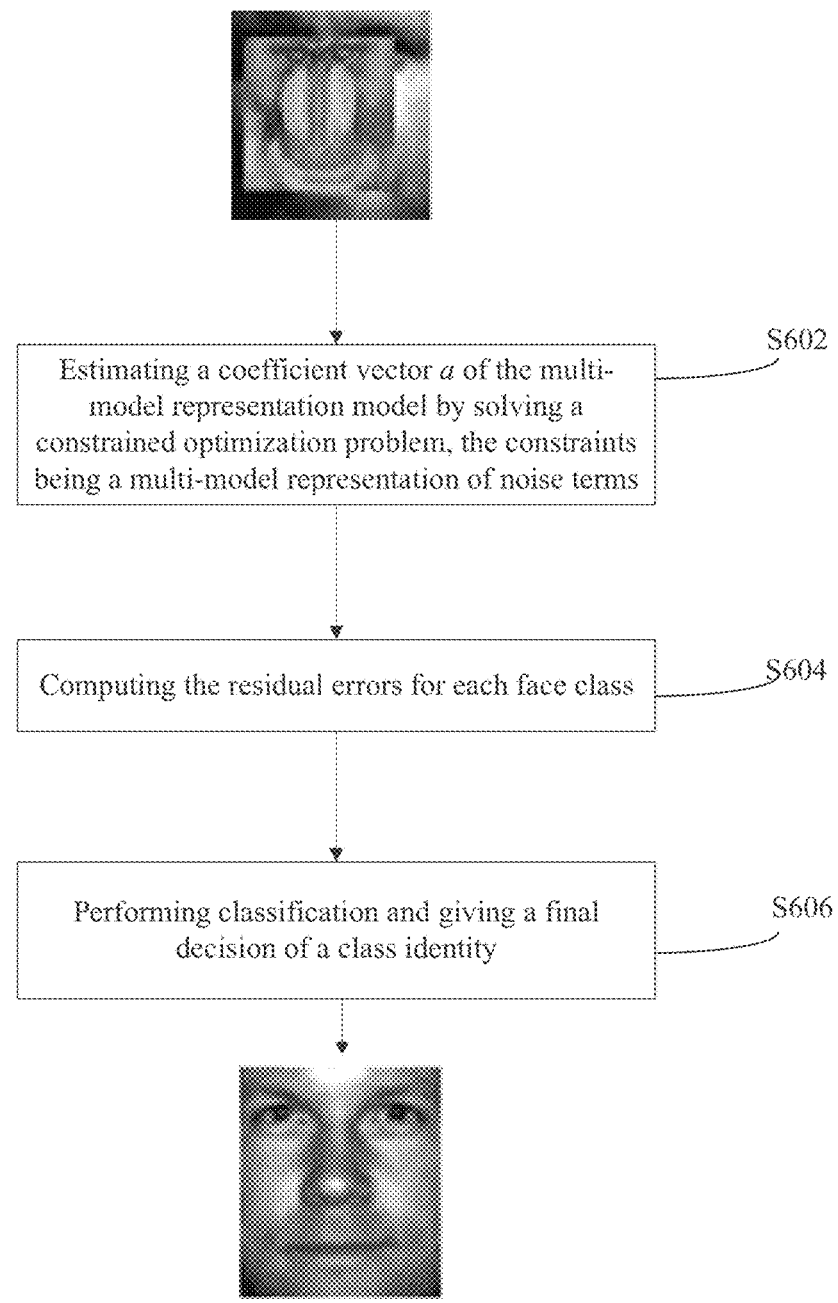
FIG. 6 illustrates an exemplary robust error correction multi-model representation process consistent with the disclosed embodiments.

FIG. 6 illustrates an exemplary robust error correction multi-model representation process consistent with the disclosed embodiments. As shown in FIG. 6, after obtaining the input test samples, the representation process 600 first estimate a coefficient vector a of the multi-model representation model by solving a constrained optimization problem (S602). In certain embodiments, the constraints are a multi-model representation of noise terms. Following, the representation process 600 may compute the residual errors for each face class (S604). Finally, the classification is performed and a final decision of a class identity is given (S606). The representation process may be utilized in S510.

FIG. 7 illustrates an exemplary optimization process for estimating the coefficient vector a consistent with the disclosed embodiments. The optimization process (S602) first presents a general framework for handling image corruptions by using a multi-model representation of noise terms to formulate an optimization scheme (S702). Then, the optimization process goes on to choose one or more application specific potential loss functions for characterizing the error terms, and choose a method for regularization (S704). Finally, The formulated optimization problem is solved to obtain the coefficient vector a (S706). In certain embodiments, the optimization problem may be solved by Alternating Direction Method of Multipliers (ADMM).

Specifically, to estimate a, function J(a) can be defined as, $$J(a)=\Phi_k(y-Ta)+\lambda_\theta\theta(a), \quad (8)$$

where function $\Phi_k(x)$ is defined as, $$\Phi_k(x) \equiv \Sigma_{i=1}^d \phi_k(x_i) = \min_y \frac{1}{2}\|x-y\|_2^2 + \varphi_k(y). \quad (9)$$

In equation (9), $\phi_k: \mathbb{R} \to \mathbb{R}$ represents an application specific potential loss function which can be selected from a variety of candidates while $\phi_k(\bullet)$ is the dual potential function of $\varphi_k(\bullet)$, (see Table 1). Furthermore, function $\theta(\bullet)$ belongs to the class of $l_p$ norms $$\left(\|x^p\|^{\frac{1}{p}}\right)$$

and, $\lambda_\theta > 0$.

The formulation above allows for the compact and general representation of many existing algorithms in the face recognition literature. For example, in a degenerate case, $\phi_k(x_i) = x_i^2 = [(y-Ta)^2]_i$ and $\theta(a) \equiv \|a\|_2^2$ can lead to the well-known regularized least-squares formulation, $$a = \operatorname{argmin}_a \frac{1}{2}\|y - Ta\|_2^2 + \lambda_\vartheta \|a\|_2^2. \quad (10)$$

A multi-model representation of the noise term is employed to present a general framework for handling most types of image corruptions (S702). In this way, the modeling constraints of the noise are relaxed and extra degrees of freedom are enabled so that the noise term can be described with non-standard distributions in order to handle mixed variations in the captured scene. In certain embodiments, two potential loss functions can be incorporated into (8) for better characterizing the error term y−Ta. The function in (8) can be re-written as, $$\tilde{J}(a) = \Phi_1(y-Ta) + \Phi_2(y-Ta) + \lambda_\theta \theta(a), \quad (11)$$

and the optimization problem is given by, $$a = \operatorname{argmin}_a \tilde{J}(a). \quad (12)$$

Based on equation (9), and by denoting e=y−Ta and introducing the auxiliary variable z=e, the minimization of a in (12) can be reformulated as a constrained optimization problem as, $$\begin{array}{l}\underset{a,e,z}{\operatorname{minimize}} \quad \varphi_1(e) + \varphi_2(z) + \lambda_\vartheta \vartheta(a) \\ \text{subject to} \quad y - Ta = e, \, e = z.\end{array} \quad (13)$$

The optimization setup in (13) allows the implicit incorporation of various loss functions $\phi_k(\bullet)$ through their dual potential functions $\varphi_k(\bullet)$(S704). Possible choices of pairs of functions and their proximity operators are summarized in Table 1. For the case when s is a vector, equivalent results are shown in Table 2.

TABLE 1

Some choices of $\phi_k$ and their proximity operators $\operatorname{prox}_{\psi k}(s) = s - \phi_k'(s)$.

| Estimator | $\phi_k(s)$ | $\operatorname{prox}_{\phi k}(s)$ |
|---|---|---|
| Neg. Gaussian | $\frac{\sigma^2}{2}\left(1 - \exp\left(-\frac{s^2}{\sigma^2}\right)\right)$ | $s - s\exp\left(-\frac{s^2}{\sigma^2}\right)$ |

TABLE 1-continued

Some choices of $\phi_k$ and their proximity operators $\operatorname{prox}_{\psi k}(s) = s - \phi_k'(s)$.

| Estimator | $\phi_k(s)$ | $\operatorname{prox}_{\phi k}(s)$ |
|---|---|---|
| Huber | $\begin{cases} s^2/2 & \|s\| \le \lambda \\ \lambda\|s\| - \frac{\lambda^2}{2} & \|s\| > \lambda \end{cases}$ | $\begin{cases} 0 & \|s\| \le \lambda \\ s - \lambda\operatorname{sign}(s) & \|s\| > \lambda \end{cases}$ |

TABLE 2

Choice of proximity operators when $\phi_k$ is defined with a vector argument, such that $\phi_k \equiv \phi_k(s)$. $T_M$ is an operator that transforms its vector argument into a matrix of appropriate size and $L_\lambda(\cdot)$ denotes the SVD (singular value decomposition) of its matrix argument.

| Estimator | $\phi_k(s)$ | Proximity Operator |
|---|---|---|
| Nuclear | $\lambda\|T_M(s)\|_*$ | $L_\lambda(T_M(s)) = U_S S_\lambda(\Sigma_S) V_S^T$<br>$S_\lambda(\Sigma_S) = \operatorname{sign}(s_{ij}) \max(0, \|s_{ij}\| - \lambda)$ |
| Quadrate | $\frac{\lambda}{2}\|y - Ts\|_2^2$ | $(\lambda T^T T + I)^{-1} \lambda T^T y$ |
| $l_1$ | $\lambda\|s\|_1$ | $\operatorname{sign}(s_i) \max(0, \|s_i\| - \lambda)$ |

For example, $\Phi_1$, $\Phi_2$ can be selected as Huber and Nuclear, respectively. The framework generalizes on these results considering such formulation as a specific case while allowing the selection of application specific error modeling functions. Recognition rates on human faces with varying expressions and illumination, as well as occlusions and disguise, indicate that the $l_2$-norm is more robust than the sparse coding methods. Therefore, certain embodiments can use the $l_2$ norm as a regularizer (S704).

In certain embodiments, the problem in (13) can be solved by the Alternating Direction Method of Multipliers (ADMM), which is intended to blend the decomposability of dual ascent with the superior convergence properties of the method of multipliers (S706). In the ADMM formulation of (13), a, e and z are updated in an alternating fashion. Thus, as in dual ascent and the method of multipliers, ADMM consists of four steps: e-estimation (S7062), z-estimation (S7064), a-estimation (S7066), and dual variable updates (S7068). As in the method of multipliers, (13) can take the form of augmented Lagrangian, $$L(e, z, a) = \varphi_1(e) + \varphi_2(z) + \lambda_\vartheta \vartheta(a) + \quad (14)$$
$$u_1^T(y - Ta - e) + \frac{\rho}{2}\|y - Ta - e\|_2^2 + u_2^T(e - z) + \frac{\rho}{2}\|e - z\|_2^2,$$

where $\rho > 0$ is a penalty parameter, and $u_1$ and $u_2$ are the dual variables.

Using the scaled dual variables $$y_1 = \frac{1}{\rho}u_1, \, y_2 = \frac{1}{\rho}u_2,$$

the ADMM updates can be expressed as, $$e^{k+1}=\operatorname{argmin}_e L(e,z^k,a^k,y_1^k,y_2^k), \quad (15a)$$

$$z^{k+1}=\operatorname{argmin}_z L(e^{k+1},z,y_2^k), \quad (15b)$$

$$a^{k+1}=\operatorname{argmin}_a L(e^{k+1},a,y_1^k), \quad (15c)$$

$$y_1^{k+1}=y_1^k+y-Ta^{k+1}-e^{k+1}, \quad (15d)$$

$$y_2^{k+1}=y_2^k+e^{k+1}-z^{k+1}. \quad (15e)$$

The ADMM is an iterative method and allows closed form updates for each of the variables through the proximity operators at each iteration. In the scaled ADMM form, the proximity operators $\operatorname{prox}_{\phi_k}(s)$ are defined as, $$x = \operatorname{argmin}_x \frac{1}{2}\|\delta - x\|_2^2 + \varphi(x) = \operatorname{prox}_\varphi(\delta) \quad (16)$$

$$x = \operatorname{argmin}_x \frac{1}{2}\|\delta - x\|_2^2 + \frac{1}{2}\|\zeta - x\|_2^2 + \varphi(x) = \frac{1}{2}\operatorname{prox}_\varphi(\delta + \zeta)$$

At each iteration, ADMM updates each variable one at a time, keeping the other variables fixed. Thus, we need four update steps corresponding to the optimization with respect to e, z, a and the scaled dual variables $y_1$, $y_2$. The steps of the updates are given as, Step 1—Update e (S7062), $$e = \operatorname{argmin}_e \frac{1}{2}\|y - Ta + y_1 - e\|_2^2 + \frac{1}{2}\|z - y_2 - e\|_2^2 + \frac{1}{\rho}\varphi_1(e) \quad (17)$$

$$\boxed{e = \frac{1}{2}\operatorname{prox}_{\varphi_1/\rho}(y - Ta + y_1 + z - y_2)}.$$

Step 2—Update z (S7064), $$z = \operatorname{argmin}_z \frac{1}{2}\|e + y_2 - z\|_2^2 + \frac{1}{\rho}\varphi_2(e) \quad (18)$$

$$\boxed{z = \operatorname{prox}_{\varphi_2/\rho}(e + y_2)}.$$

Step 3—Update a (S7066), $$a = \operatorname{argmin}_a \frac{1}{2}\|y - Ta - e + y_1\|_2^2 + \frac{\lambda}{\rho}\vartheta(a) \quad (19)$$

$$\boxed{a = \operatorname{prox}_{\vartheta\lambda/\rho}(y_1 - e - y)}.$$

Step 4—Update Multipliers $y_1$ and $y_2$ (S7068), $$y_1=y_1+y-Ta-e, \quad (20)$$

$$y_2=y_2+e-z. \quad (21)$$

In order to guarantee convergence of the optimization problem (13) using ADMM, it is sufficient to enforce appropriate termination criteria and parameters. In some embodiments, the termination criteria can be set as: $\|y-Ta-e\|_\infty \le \epsilon$ and $\|e-z\|_\infty \le \epsilon$, where $\epsilon=10^{-7}$.

Returning to FIG. 6, the face class that yields the minimum reconstruction error is selected in order to classify or identify the subject. Therefore, the residual errors for each face class are computed (S604). Specifically, the estimated error e is subtracted from the test sample y, the classification is given by computing the residuals for each class i as, $$e_i(y) = \frac{\|y - e - T_i a_i\|_2}{\|a_i\|_2}, \quad (22)$$

where $a_i$ is the segment of a associated with class i. Comparing to traditional sparce representation classification (SRC), this approach is more accurate for collaborative representations.

Finally, classification is performed and the decision of the class identity is given (S5106). Specifically, the identity of y is given as, $$\text{Identity}(y)=\operatorname{argmin}_i\{e_i\} \quad (23)$$

The complete steps of the robust error correction with multi-model representation (REC-MM) method are summarized and presented in Algorithm 1 in Table 3.

TABLE 3

| Algorithm 1: REC-MM algorithm |
|---|
| Algorithm 1 The Robust Error Correction with Multi-Model Representation Algorithm (REC-MM) |
| Inputs: y, T, $\phi_1(\cdot)$, $\phi_2(\cdot)$, $\hat{v}(\cdot)$, $\lambda_\theta$ and parameters of $\phi_1$ and $\phi_2$.<br>1. Estimate â by solving the problem.<br>$\quad \underset{a,e,z}{\text{minimize}}\; \varphi_1(e) + \varphi_2(z) + \lambda_\theta \hat{v}(a)$.<br>$\quad$ subject to y − Ta = e, e = z.<br>2. Compute the residuals $e_i(y)$ for each class i, using (22).<br>Output: Identity of y as, Identity(y) = $\operatorname{argmin}_i\{e_i\}$. |

The computational complexity of REC-MM is O(jk+jk+njk). The classifier is computationally efficient due to the fact that the representation coefficients are regularized with the $l_2$-norm, thus only requiring one matrix inversion in the iterative scheme. In prior art, the computational complexity of RRC_L1 (Regularized Robust Coding with $l_1$ norm) is $O(j^2k^2n)$, of RRC_L2 (Regularized Robust Coding with $l_2$ norm) is $O(k_1 jkn)$ (where $k_1$ is the number of iterations in the conjugate gradient descent), and the computational complexity of a similar classifier proposed in Nuclear-L1 norm joint regression is $O(jk^2+n^2+njk)$. Therefore, in face recognition applications, where the parameters n,j,k satisfy some conditions (e.g., jk≥10, jn≥10), the REC-MM classifier have lower computational complexity than RRC_L1 and RRC_L2, and lower or equal computational complexity to that of the classifier proposed in Nuclear-L1 norm joint regression.

Returning to FIG. 5, after the classification is performed (S510), the identity is presented to the user or to other application programs (S512).

For example, a video may be generated containing the recognized face images, annotations may be added to the recognized faces in the video according to the face tracks, the user may be prompted with the identity of the subject in the video, or the identity of the subject in the video may be provided to an application program and the application program may alert the user of certain events, such as to alert the user of its favorite show, or a security situation, etc.

Figure 8:
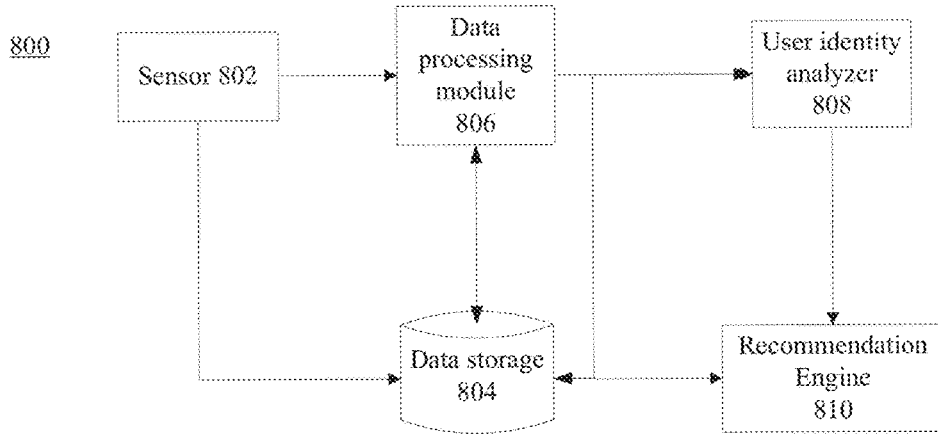
FIG. 8 illustrates another exemplary face recognition system consistent with the disclosed embodiments.

FIG. 8 illustrates another exemplary face recognition system consistent with the disclosed embodiments. As shown in FIG. 8, the face recognition system 800 may include a sensor 802, a data storage 804, a data processing module 806 and a user identity analyzer 808. Certain components may be omitted and other components may be added.

The sensor 802 may be any physical or virtual device capable of capturing images for further processing. For example, the sensor 802 may include physical sensors such as the digital camera 112, the TV 102 with built-in camera, the remote control 104 with built-in camera, and virtual sensors such as the network 110, the portable storage 114, and the data storage 116. The acquired data from the sensors may include any graphical representations of faces, such as images and videos. The sensor 802 may include a plurality of sensors for obtaining a variety of sensing data. The acquired data from the sensor 802 may be stored in the data storage 804.

The data storage 804 may store acquired data from the sensor 802, training face images or videos of user identities, user activities, user preferences and recommendation contents according to user identity.

Further, the face recognition system 800 may include a recommendation engine 810. The data processing module 806, user identity analyzer 808, and the recommendation engine 810 are configured to perform various processing based on the data from the sensor 802 and data storage 804. For example, the sensing data processing module 806 may pre-process the images or videos from the sensor 302 and extract face samples for further identification. The data processing module 806 may also pre-process user identity information, such as pre-stored user face samples in the data storage 804.

The user identity analyzer 808 may use the processed data to determine a current user based on the training face samples and the data acquired from the sensor 802 and processed in the processing module 806. The user identity analyzer 808 may employ the robust error correction multi-model representation process 600 to determine the user identity.

In operation, a current user 108 may be holding the remote control 104, sitting in front of the TV 102 or using a smart phone. That is the sensor 802 is activated to collect user data. The face images collected from the same subject may be captured under different conditions (e.g., poses, lighting conditions, occlusions etc). The data processing module 806 may extract the face test samples for further processing. The user identity analyzer 808 may classify and determine the current user identity according to the training face samples from the data storage 804. The recommendation engine 810 may recommend personalized contents to the user according to the user's identity, such as TV channels, news websites, online videos and shopping guides according to the user's interests.

Figure 9:
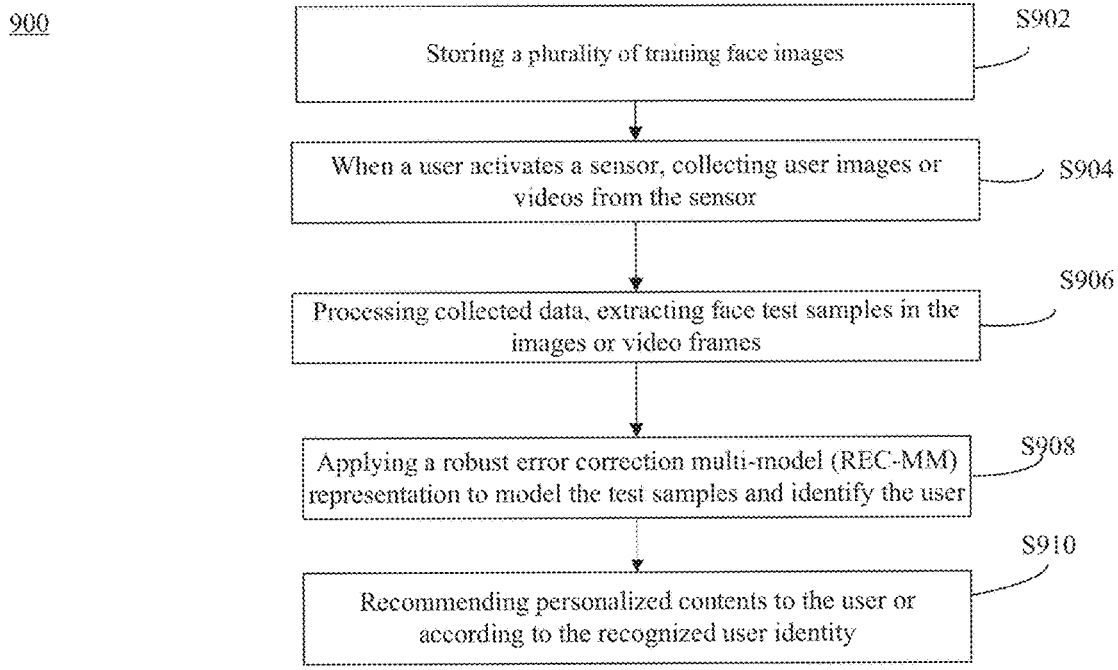
FIG. 9 illustrates another exemplary face recognition process consistent with the disclosed embodiments.

FIG. 9 illustrates another exemplary face recognition process consistent with the disclosed embodiments. As shown in FIG. 9, the face recognition process 900 first stores a plurality of training face images (S902). Each training face image corresponds to a face class, and each face class may include one or more training face images. When a user activates a sensor, the process 900 then collects images or videos from the sensor (S904). For example, when a user approaches a remote control with built-in camera, the camera may capture the user's face images. The collected data are then processed to extract face test samples in the images or video frames (S906). Following, a robust error correction multi-model representation model may be applied to the face test samples and identify the user (S910). This process may employ the robust error correction multi-model representation process 600 to determine the user identity.

After the user identity is determined, the user may be prompted with recommended personalized contents (S910).

By using the disclosed systems and methods, many advantageous applications can be implemented. The face recognition techniques may be applied to the video domain where faces of key persons in a video can be automatically detected and recognized to facilitate various multimedia management tasks, such as news video summarization, retrieval and browsing.

It is understood that the disclosed face recognition model is not limited to TV usage scenario. The disclosed systems and methods can also be applied to any devices with displays, such as smart phones, tablets, PCs, smart watches, and so on. The disclosed methods can also be applied as the core function for other systems, such as content-based video recommendation systems, content-based video retrieval systems, and so on.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A face recognition method on a computing device, comprising:
    storing a plurality of training face images, each training face image corresponding to a face class, each face class including one or more training face images;
    obtaining one or more face test samples;
    applying a representation model to represent the face test sample as a combination of the training face images and error terms, wherein a coefficient vector is corresponded to the training face images;
    estimating the coefficient vector and the error terms by solving a constrained optimization problem, including:
        presenting a general framework by using a multi-model representation of error terms to formulate the constrained optimization problem,
        choosing one or more application-specific potential loss functions for characterizing the error terms,
        choosing a method for regularization, and
        solving the constrained optimization problem,
        wherein each application-specific potential loss function is a summation of dual potential functions;
    computing a residual error for each face class, the residual error for a face class being an error between the face test sample and the face test sample's representation model represented by the training samples in the face class;
    classifying the face test sample by selecting the face class that yields the minimal residual error; and
    presenting the face class of the face test sample;
    wherein:
        provided that that $y \in \mathbb{R}^d$ denotes a face test sample and $T=[T_i, \ldots, T_c] \in \mathbb{R}^{d \times n}$ denotes a face dictionary, a face dictionary being a matrix with a set of training samples of c subjects stacked in columns, $T_i \in \mathbb{R}^{d \times n_i}$ denotes the $n_i$ set of samples of the $i^{th}$ subject, such that $\Sigma_i n_i = n$, a denotes the coefficient vector, $J(a)$ denotes a function of the coefficient vector a,
        the general framework to formulate the constrained optimization problem is defined to estimate the coefficient vector a that minimizes:
        $$J(a) = \Phi_k(y - Ta) + \lambda_\theta \theta(a)$$
    wherein function $\Phi_k(x)$ represents an application-specific potential loss function, and function $\theta(\cdot)$ defines the method of regularization.

2. The face recognition method according to claim 1, wherein:
the error terms are characterized image corruption types including one or more of occlusion, disguise, varying facial expression and lighting variation.

3. The face recognition method according to claim 1, wherein
function $\Phi_k(x)$ is defined as, $$\Phi_k(x) \equiv \sum_{i=1}^{d} \phi_k(x_i) = \min_y \frac{1}{2}\|x-y\|_2^2 + \varphi_k(y)$$

wherein $\Phi_k: \mathbb{R} \to \mathbb{R}$ represents an application-specific potential loss function, function $\theta(\cdot)$ belongs to the class of $l_p$ norms $$\left(\|x^p\|^{\frac{1}{p}}\right)$$

and $\lambda_\theta > 0$.

4. The face recognition method according to claim 1, wherein:
obtaining one or more face test samples further comprising:
dividing an input video into different sets of frames;
detecting faces of each frame in the input video;
generating face tracks for the whole video, a face track being a group of detected faces within a same camera take; and
obtaining detected faces and face tracks information; and
presenting the face class of the face test sample further comprising:
outputting a video by adding annotations to the recognized face in the input video according to the face tracks.

5. The face recognition method according to claim 1, further comprising:
storing a user's preference along with the training face images corresponding to the user; and
after obtaining the face class of the face test sample, recommending personalized contents to the user according to the user's preference.

6. The face recognition method according to claim 1, wherein:
provided that that $y \in \mathbb{R}^d$ denotes a face test sample and $T=[T_i, \ldots, T_c] \in \mathbb{R}^{d \times n}$ denotes a face dictionary, a face dictionary being a matrix with a set of training samples of c subjects stacked in columns, $T_i \in \mathbb{R}^{d \times n_i}$ denotes the $n_i$ set of samples of the $i^{th}$ subject, such that $\Sigma_i\, n_i = n$, e denotes the estimated error terms,
the classification is given by computing the residuals $e_i$ for each class i as, $$e_i(y) = \frac{\|y - e - T_i a_i\|_2}{\|a_i\|_2}$$

the face class of y is given as,

Identity$(y) = \text{argmin}_i\{e_i\}$.

7. A face recognition method on a computing device, comprising:
storing a plurality of training face images, each training face image corresponding to a face class, each face class including one or more training face images;
obtaining one or more face test samples;
applying a representation model to represent the face test sample as a combination of the training face images and error terms, wherein a coefficient vector is corresponded to the training face images;
estimating the coefficient vector and the error terms by solving a constrained optimization problem, including:
presenting a general framework by using a multi-model representation of error terms to formulate the constrained optimization problem,
choosing one or more application-specific potential loss functions for characterizing the error terms,
choosing a method for regularization, and
solving the constrained optimization problem;
computing a residual error for each face class, the residual error for a face class being an error between the face test sample and the face test sample's representation model represented by the training samples in the face class;
classifying the face test sample by selecting the face class that yields the minimal residual error; and
presenting the face class of the face test sample;
wherein:
provided that that $y \in \mathbb{R}^d$ denotes a face test sample and $T=[T_i, \ldots, T_c] \in \mathbb{R}^{d \times n}$ denotes a face dictionary, a face dictionary being a matrix with a set of training samples of c subjects stacked in columns, $T_i \in \mathbb{R}^{d \times n_i}$ denotes the $n_i$ set of samples of the $i^{th}$ subject, such that $\Sigma_i\, n_i = n$, a denotes the coefficient vector, J(a) denotes a function of the coefficient vector a,
the general framework to formulate the constrained optimization problem is defined to estimate the coefficient vector a that minimizes:

$$J(a) = \Phi_k(y - Ta) + \lambda_\theta \theta(a)$$

wherein function $\Phi_k(x)$ is defined as, $$\Phi_k(x) \equiv \sum_{i=1}^{d} \phi_k(x_i) \min_y \frac{1}{2}\|x-y\|_2^2 + \varphi_k(y)$$

wherein $\phi_k: \mathbb{R} \to \mathbb{R}$ represents an application-specific potential loss function, function $\theta(\cdot)$ defines the method of regularization and belongs to the class of $l_p$ norms $$\left(\|x^p\|^{\frac{1}{p}}\right)$$

and $\lambda_\theta > 0$.

8. The face recognition method according to claim 7, wherein:
two potential loss functions are incorporated and J(a) is re-written as $$\tilde{J}(a) = \Phi_1(y - Ta) + \Phi_2(y - Ta) + \lambda_\theta \theta(a)$$

the optimization problem is given by $$a = \text{argmin}_a \tilde{J}(a)$$

denoting $e = y - Ta$ and introducing the auxiliary variable $z = e$, the minimization of a is reformulated as a constrained optimization problem as, $$\underset{a,e,z}{\text{minimize}} \quad \varphi_1(e) + \varphi_2(z) + \lambda_\vartheta \vartheta(a)$$
$$\text{subject to} \quad y - Ta = e, e = z.$$

9. The face recognition method according to claim 8, wherein:
$\Phi_1$, $\Phi_2$ are selected from error functions including Negative Gaussian, Huber, Nuclear and Quadratic estimator.

10. The face recognition method according to claim 8, wherein:
the constrained optimization problem is solved by the Alternating Direction Method of Multipliers (ADMM), wherein a, e, z and scaled dual variables $y_1$, $y_2$ are updated in an alternating fashion in each iteration.

11. The face recognition method according to claim 7, wherein:
$l_2$ norm is selected as the regularization method.

12. A face recognition system based on a computing device, comprising:
a storage module configured to store a plurality of training face images, each training face image corresponding to a face class, each face class including one or more training face images;
an acquisition module configured to obtain one or more face test samples;
an algorithm module configured to:
apply a representation model to represent the face test sample as a combination of the training face images and error terms, wherein a coefficient vector is corresponded to the training face images;
estimate the coefficient vector and the error terms by solving a constrained optimization problem, including:
presenting a general framework by using a multi-model representation of error terms to formulate the constrained optimization problem,
choosing one or more application-specific potential loss functions for characterizing the error terms,
choosing a method for regularization, and
solving the constrained optimization problem,
wherein each application-specific potential loss function is a summation of dual potential functions;
compute a residual error for each face class, the residual error for a face class being an error between the face test sample and the face test sample's representation model represented by the training samples in the face class; and
classify the face test sample by selecting the face class that yields the minimal residual error; and
a presentation module configured to present the face class of the face test sample;
wherein:
provided that that $y \in \mathbb{R}^d$ denotes a face test sample and $T=[T_i, \ldots, T_c] \in \mathbb{R}^{d \times n}$ denotes a face dictionary, a face dictionary being a matrix with a set of training samples of c subjects stacked in columns, $T_i \in \mathbb{R}^{d \times n_i}$ denotes the $n_i$ set of samples of the $i^{th}$ subject, such that $\Sigma_i$ $n_i$=n, a denotes the coefficient vector, J(a) denotes a function of the coefficient vector a,
the general framework to formulate the constrained optimization problem is defined to estimate the coefficient vector a that minimizes:

$$J(a) = \Phi_k(y-Ta) + \lambda_\theta \theta(a)$$

wherein function $\Phi_k(x)$ represents an application-specific potential loss function, and function $\theta(\cdot)$ defines the method of regularization.

13. The face recognition system according to claim 12, wherein:
the error terms are characterized image corruption types including one or more of occlusion, disguise, varying facial expression and lighting variation.

14. The face recognition system according to claim 12, wherein
function $\Phi_k(x)$ is defined as, $$\Phi_k(x) \equiv \sum_{i=1}^{d} \phi_k(x_i) = \min_y \frac{1}{2}\|x-y\|_2^2 + \varphi_k(y)$$

wherein $\Phi_k: \mathbb{R} \to \mathbb{R}$ represents an application-specific potential loss function, function $\theta(\cdot)$ belongs to the class of $l_p$ norms $$\left(\|x^p\|^{\frac{1}{p}}\right)$$

and $\lambda_\theta > 0$.

15. The face recognition system according to claim 12, wherein:
obtaining one or more face test samples further comprising:
dividing an input video into different sets of frames;
detecting faces of each frame in the input video;
generating face tracks for the whole video, a face track being a group of detected faces within a same camera take; and
obtaining detected faces and face tracks information; and
presenting the face class of the face test sample further comprising:
outputting a video by adding annotations to the recognized face in the input video according to the face tracks.

16. The face recognition system according to claim 12, wherein:
the storage module is further configured to store a user's preference along with the training face images corresponding to the user; and
the presentation module is further configured to recommend personalized contents to the user according to the user's preference after obtaining the face class of the face test sample.

* * * * *